(12) United States Patent
Archambeault

(10) Patent No.: US 6,582,506 B2
(45) Date of Patent: Jun. 24, 2003

(54) PIGMENT FLAKES

(75) Inventor: Michael E. Archambeault, Granby, MA (US)

(73) Assignee: Hampden Papers, Inc., Holyoke, MA (US)

(*) Notice: Subject to any disclaimer, the term of this patent is extended or adjusted under 35 U.S.C. 154(b) by 0 days.

(21) Appl. No.: 09/865,896

(22) Filed: May 25, 2001

(65) Prior Publication Data

US 2001/0047739 A1 Dec. 6, 2001

Related U.S. Application Data

(60) Provisional application No. 60/207,772, filed on May 30, 2000.

(51) Int. Cl.⁷ .............. C08L 89/00; C09D 1/00; C09C 1/36; B32B 19/00; B02C 17/02
(52) U.S. Cl. .......... 106/415; 427/216; 427/218; 427/220; 427/222; 427/255.6; 106/218; 106/241; 106/286.1; 106/403; 106/412; 106/415; 106/438; 106/439; 106/440; 106/441; 106/442; 106/445; 106/447; 106/450; 106/451; 106/452; 106/453; 106/455; 106/456; 106/460; 106/479; 106/480; 106/499; 106/500; 428/357; 428/375; 428/402; 428/403; 241/24.25
(58) Field of Search ................. 427/216, 218, 427/220, 222, 255.6; 106/31.6, 31.69, 31.71–31.74, 31.96, 38.6, 218, 241, 286.1–286.5, 403, 404, 412, 414, 415, 438–442, 445, 447, 450–453, 455, 456, 460, 479, 480, 499, 500

(56) References Cited

U.S. PATENT DOCUMENTS

| | | |
|---|---|---|
| 3,697,070 A | 10/1972 | McAdow |
| 3,713,870 A | 1/1973 | Kaye |
| 3,988,494 A | 10/1976 | McAdow |
| 4,003,872 A | 1/1977 | Rolles et al. |
| 4,116,710 A | 9/1978 | Heikel |
| 4,173,492 A | 11/1979 | Pollard |
| 4,321,087 A | 3/1982 | Levine et al. |
| 4,481,233 A | 11/1984 | Sakata et al. |
| 4,587,198 A * | 5/1986 | Fisch .................. 430/201 |
| 4,657,840 A | 4/1987 | Fisch |
| 5,236,739 A * | 8/1993 | Chou et al. ............. 427/146 |
| 5,358,669 A | 10/1994 | Demiryont et al. |
| 5,418,056 A | 5/1995 | Noguchi et al. |
| 5,662,963 A * | 9/1997 | Hishida .................. 427/212 |
| 5,718,753 A | 2/1998 | Suzuki et al. |
| 5,753,023 A * | 5/1998 | Bishop .................. 106/415 |
| 5,814,686 A | 9/1998 | Micale et al. |
| 5,895,524 A | 4/1999 | Dickson |
| 6,019,831 A | 2/2000 | Schmidt et al. |
| 6,150,022 A | 11/2000 | Coulter et al. |

OTHER PUBLICATIONS

Fetsko, Jacqueline M., NPIRI Raw Materials Data Handbook, vol. 4, Pigments (1983) no month available.

* cited by examiner

*Primary Examiner*—Mark L. Bell
*Assistant Examiner*—Patricia L. Hailey
(74) *Attorney, Agent, or Firm*—McCormick, Paulding & Huber LLP

(57) ABSTRACT

Pigment flakes having cores preferably composed of resins, polymers, thermoplastics, and/or thermosets with colorant (pigment and/or dyes) deposited thereon, coating applications thereof, and a method for making pigment flakes which includes providing a core material, compounding the core material, processing the core material into uniform forms such as films, wires, thread with rectangular cross sections and bead strings, providing colorant material, vaporizing the colorant material, exposing a surface of core material to the vaporized colorant material to form a layer of colorant on thereon, and fracturing the resultant colorant layered core material into flakes.

34 Claims, No Drawings

PIGMENT FLAKES

CROSS REFERENCE TO RELATED APPLICATIONS

This application claims the benefit of U.S. Provisional Application Ser. No. 60/207,772, filed on May 30, 2000.

FIELD OF THE INVENTION

The present invention relates to the field of pigmented coating materials. In particular, the present invention relates to pigment flakes having brilliant and highly reflective optical characteristics, to coating applications thereof, and to a method of making the pigment flakes using vapor deposition techniques to deposit a thin layer of colorant directly on a core material which is subsequently fractured to form discrete flakes.

BACKGROUND OF THE INVENTION

Colorants are well known classes of chemicals which are used to color or modify the hue of a substrate. Various forms of colorants have been used throughout human history. The term colorant includes, but is not limited to, organic and inorganic pigments, dyes, and combinations thereof. Metals are considered inorganic pigments; however, pure metals and alloys are frequently considered separately. The Colour Index International: Fourth Edition Online (Colour Index) is an internationally recognized registry of colorants, and is published jointly by the British-based Society of Dyers and Colourists and the American Association of Textile Chemists and Colorists. The Colour Index is found online at www.colour-index.org, and includes 800 color index classifications and a listing of thousands of pigment and dye products. The listings include chemical properties and manufacturers.

The fundamental difference between pigments and dyes is that dyes are soluble in the application medium while pigments are insoluble. Colorants, in general, are divided into appropriate hue groups, which include yellow, orange, red, violet, blue, green, brown and black in that order, additionally pigments further include the hue groups white and metals. Objects are colored if they selectively absorb and reflect incident light. Pure white reflects all light uniformly and pure black reflects no light. Pigments retain a crystal or particulate structure throughout the coloration process. Furthermore, pigments alter appearance by selective absorption and/or by scattering of light. Pigments are usually dispersed in vehicles or substrates for application, as for instance in the manufacture of inks, paints, plastics, or other polymeric materials. Dyes, on the other hand, are soluble, and the crystal structure of the chemical substance is typically destroyed, at least temporarily.

Pigmented coatings and pigment powders are well known. Pigment powders are composed of very small particles or flakes of organic or inorganic pigment. Particle shape is important in some applications. Needlelike particles apparently improve brushability and enhance adhesion, while platelike particles physically block out light and moisture thereby offering corrosion protection. A variety of particulate shapes are known, including needlelike, rodlike, spherical, cubic, small platelet and large platelet. Combinations of shapes may be present in single batches of pigment. Particle size is also an important consideration that influences the color strength, gloss, rheology, opacity and light fastness of pigment applications.

Pigmented coatings typically involve suspending a small amount of pigment powder in water or a volatile substance, applying the suspension to a substrate, and allowing the liquid in the suspension to evaporate thus covering the substrate with particles of pigment. U.S. Pat. No. 3,713,870 discloses a coating method for depositing metallic flakes on the surface of an object; the method involves suspending very thin, relatively small flakes in a volatile liquid, coating an object with the resulting suspension, and allowing the volatile liquid to evaporate resulting in the object having a thin, metallic coating held in place by intermolecular attraction. U.S. Pat. No. 4,003,872 describes a process whereby small flakes of metal and plastic particles are polished together to form a polished metal flake pigmented plastic powder product; upon application to a substrate, the plastic powder product is melted to form a smooth uniform film coating. Nearly all coatings require flakes of organic or inorganic pigment to provide the desired optical effect.

Generally, the amount of reflection a surface presents is directly proportional to the smoothness and regularity of the surface on the molecular level. Densely packed molecular surfaces, which are relatively unbroken having few apertures, breaks, depressions or prominences, are highly reflective. Light hitting a smooth and regular molecular surface reflects off the surface at highly uniform, discrete angles resulting in a brilliant and lustrous appearance analogous to smooth polished metals or mirrors. Light striking an irregular molecular surface is reflected at odd, nonuniform angles resulting in a dull appearance.

Most affordable pigments naturally have irregular shapes resulting in a dull, lusterless appearance. For example, the natural state of aluminum, an ingot, has a dull light-gray appearance. The molecules of aluminum naturally clump together in irregular patterns. A microscopic view would reveal jagged surfaces with crevices and protrusions. When aluminum is ground up and dispersed into a coating medium such as water or other solvent, and applied utilizing any conventional coating, printing or other technique, the resulting appearance is dull and gray. The natural states of nonmetallic inorganic and organic pigments are comparable. The appearances of other pigments in coating and printing applications having similar irregular shapes are the same. Carbon black, for example, has an irregular lumpy shape at the molecular level and a dull black appearance. When nonmetallic inorganic or organic pigments are fractured and utilized in coating, printing or other applications, the result is a flat nonreflective coloring.

Many techniques are utilized to improve the smoothness, gloss and brilliance of coatings containing pigmented powder. The first consideration is the smoothness and regularity of the article to be coated. Providing an initially smooth and regular surface is the first step in achieving a reflective, glossy coat. Other techniques involve grinding the pigment into very fine particles, integrating the particles into a coating composition, cross-linking the coating through energy infusion, and doctoring, calendering or embossing after the coating has been applied to the substrate. Additionally, extreme precision in the placement of pigment flakes in coating or printing applications may be used to assure that the pigment flakes present a smooth face so that the angles of reflection of the separate flakes are predominantly uniform. These techniques may be quite expensive and time consuming.

Dyes are inherently nonreflective. According to the Dyes and Toxicology Organization, which represents domestic dye manufacturers, dyes are defined as intensely colored or fluorescent organic substances which impart color to a substrate by selective absorption of light. To be reflective, dyes must be added to a reflective medium such as a glossy coating medium or the like.

Numerous methods have been developed to make fine thin flakes of metal for use as pigments. These metallic flakes have the disadvantage of bending, curling or breaking. Malformed metallic flakes have less than desirable optical qualities because they do not present a smooth surface. U.S. Pat. No. 4,321,087 issued to Levine et al. on Mar. 23, 1982 discloses a process for making metallic leafing pigments. The process therein involves a release coating continuously applied to at least one side of a carrier sheet. Metal vapor is condensed onto at least one surface of the release coating forming a thin metal film. The carrier sheet, the release coating and the thin metal film are then passed through a solvent system which releases most of the thin metal film into the solvent. The thin metal film is placed in a non-reactive liquid medium where it is fractured into finer pigment particles by vigorous stirring or ultrasonics The resulting metal flakes are concentrated and formulated into coating and printing compositions.

U.S. Pat. No. 5,718,753 b issued to Suzuki et al. on Feb. 17, 1998 describes colored metallic pigment flakes and the preparation thereof. The invention involves using a vacuum evaporation apparatus, which may have a vibrating unit, to produce metallic flakes having colored pigment evenly deposited on a metal core. Furthermore, the invention of Suzuki et al. describes a method for coloring polymeric materials en mass by contacting the particles of colored metallic pigment with polymeric material, incorporating the particles into the polymeric material, and utilizing the polymeric material as a coating composition. The colored metallic flakes still may become malformed reducing their reflective quality.

U.S. Pat. No. 5,895,524 issued to Dickson on Apr. 20, 1999 describes a method of making thin film metal particulates for use as paint pigments. The method involves immersing a metallized sheet of fluorinated ethylene propylene first in an aqueous base and then in an aqueous acid to loosen and release the metal. The metals are subsequently dislodged from the fluorinated ethylene propylene with one or more counter rotating cylindrical nylon bristle brushes, or with ultrasonic vibration alone or in combination with the brushes. Thin metal particulates are formed. The metallized sheet of fluorinated ethylene propylene with the proper thickness may be prepared by sputtering the metal onto 2 mil thick fluorinated ethylene propylene sheet stock. Suitable metals include germanium and aluminum. The invention of Dickson is useful only for producing pigment flakes of metals and not for nonmetal colorants.

U.S. Pat. No. 4,116,710 issued to Heikel on Sep. 26, 1978 discloses a method of making metallic particulates suitable for use in coating compositions. The method involves depositing a metal on a substrate by electroless, vapor (including vacuum evaporation), or sputter deposition methods. The metal deposit is subsequently removed from the substrate either by dissolution of the substrate or ultrasonic means to provide a plurality of distinct metal platelets suitable for use as pigment particles. The invention of Heikel cannot be used with nonmetallic colorants regardless of the type. Generally, inventions used to produce metallic platelets, or to metallize substrates, cannot be utilized with nonmetallic colorants.

U.S. Pat. Nos. 3,697,070 and 3,988,494 issued to McAdow, on Oct. 10, 1972 and Oct. 26, 1976 respectively, describes a metallizing coating composition which is formed by sandwiching a flat polished piece of metal, preferably aluminum, between two layers of insoluble resin. The metallizing coating composition is then broken up to create small planar flakes which are flat and reflect light over a greater area. The resulting metallic pigment powder can be used as a coating powder in a conventional manner. Any colorant used must form a thin sheet with a smooth polished surface; consequently, the invention of McAdow cannot be used with typical nonmetallic colorants.

Lamination is another common method that has been used for some time. Aluminum, for example, can be calendered into a foil which is molecularly smooth and regular. The constant and uniform pressure of the calendering smooths the irregularities found in naturally occurring aluminum producing a smooth reflective surface. The resulting aluminum can subsequently be laminated to an object creating a bright, reflective surface.

Physical and chemical vapor deposition processes are well known. These processes are used to deposit molecules on a substrate. These processes may be used for decorative purposes to deposit a colorant on a substrate. Chemical vapor deposition is not typically used for decorative purposes but is used widely in the microchip industry. Numerous techniques are utilized which deposits molecules via physical vapor deposition. All of these techniques involve forming a vapor of the molecules to be deposited on a substrate. Some methods involve vacuum deposition processes, which rely on lowered pressure to propel the vapor onto the substrate. Vacuum evaporation (also known as vacuum metallizing when metals are involved), sputter deposition, arc vapor deposition, and ion plating are common methods for physical vacuum deposition. All vapor deposition processes have the disadvantage that they coat the substrate, or the exposed part of the substrate, with the evaporated colorant molecules. They are not useful in printing, painting or other applications requiring discrete use of the colorant so applied.

Vacuum metallizing is a common coating technique. Various methods of vacuum metallizing can accomplish even higher degrees of gloss than metallic laminations. The principle behind metallizing is to provide conditions, such as heat and pressure, under which aluminum, or other suitable metals, are vaporized. Nonmetallic organic and inorganic pigments may be vacuum deposited on a substrate via vacuum evaporation. The vapor of metal or other pigment is brought into contact with the surface of an object forming a coating thereon. The result is a very thin, very regular deposit of colorant on the surface of the object. This coating is only a few molecules thick, and has a brilliant and highly reflective surface. The thickness of the coating is readily controlled; however, the initial surface of the object must be sufficiently smooth to allow uniform reflection to achieve optimum results. The thinness of the coating will not fill any crevices or irregularities already present on the surface of the substrate.

Vacuum evaporation, or metallization, is not practical for use directly on paper or other objects having an irregular, rough surface. Paper, for example, must be pre-coated and pre-treated to provide the smooth, regular surface needed for metallization. Metallization of various films, including polyester, is practical, however, the film must be subsequently laminated on paper or paper-board for many artistic uses. Lamination of paper results in added costs and an extra thick layer of film, which is both unnecessary and undesirable.

Sputter deposition can be used with elements, alloys or compounds. The process can be performed in a vacuum or low-pressure gas. It can also be performed under higher atmospheric pressures by using thermalized particles. Sputter deposition is precise enough to make a line or perhaps letters. It has the disadvantage of being expensive and may require a great deal of heat. It is not useful for decorative printing or coating applications.

Arc vapor deposition is a coating method which requires the vaporization of an anode or a cathode. The substrate upon which the vapor is deposited is the opposite vapor source and serves as the cathode or anode. Clearly, this method has the disadvantage of being useful for electrically conductive materials only. This method is similar to electroplating.

Ion plating can be done in a plasma environment where ions are extracted from the plasma and bombarded onto the substrate. Another version of ion plating, referred to as ion beam assisted deposition, is done in a vacuum environment where the ions for bombardment are formed in a separate ion gun. Atomic packing near the surface of the growing film can be densified by concurrent ion bombardment (known as atomic peening) by the ion plating process. This method is not used for decorative purposes as it requires the control of many processing variables, and is typically used to deposit hard coatings of compound materials.

Plasma-enhanced chemical vapor deposition is a chemical deposition method which reduces the decomposition of a chemical-vapor precursor species that contains the material to be deposited. This method may be used to deposit a single layer of crystals on a substrate. Many elements, alloys, and glassy and compound materials can be deposited in this way. This method is typically used in semi-conductor processing and not for decorative purposes.

Hybrid vacuum deposition processes are frequently used. These processes are when two deposition techniques are used either concurrently or sequentially. The same limits are applicable to the combination of two or more techniques as to each individual technique.

Electroplating is another technique commonly used to coat the surface of an object. Electroplating is the process of coating an object with a metal using an electric current. The plating metal may be transferred to conductive surfaces, typically metals, or to nonconductive surfaces, such as plastics, wood or leather, only after the latter have been rendered conductive by such processes as coating with graphite, conductive lacquer, electroless plate, or a vaporized coating. Obviously, electroplating is unsatisfactory for use on many objects, especially paper or paperboard. Likewise, the cost and added steps involved in electroplating make it undesirable. Furthermore, electroplating may only be used with conductive materials, and is completely useless for coating objects with nonconductive colorants.

Transfer metallization is another technique which involves vacuum metallizing a specially prepared plastic film, laminating the metallized film onto another surface, and then stripping off the unwanted film. This technique reduces the costs of using the paper with the film but increases the manufacturing costs. The manufacturer must add a stripping operation to the process, and must discard, or recycle, the unwanted film in an environmentally sound procedure.

Glazing is another method used to coat objects. U.S. Pat. No. 5,358,669 issued to Demiryont et al., on Oct. 25, 1994, discloses a process for preparing plastic composite glazings which involves depositing a metal film on one surface of a plastic sheet, heating the metal film and plastic sheet to a temperature above the plastic set temperature, and deforming/mixing the plastic sheet and metal to form a plastic matrix having metal particles homogeneously dispersed therein.

Other methods have been developed to integrate metals into polymers for a variety of purposes including forming conductive polymers, and protective magnetic films. U.S. Pat. No. 5,418,056 issued to Noguchi et al. on May 23, 1995 discloses a polymer composite which includes a thermoplastic plastic polymer with a fine grain metal or metal oxide dispersed therein. A method of making the polymer composite is also disclosed. The method involves melting a polymer material, rapidly solidifying the melted polymer to form a thermodynamically non-equilibrated polymer layer, sticking a metal layer to the polymer layer, and relaxing the polymer layer until equilibrium is reached thereby dispersing fine grains (1000 nm or less) of the metal into the polymer. Alternatively, the steps forming a thermodynamically non-equilibrated polymer layer may be carried out by vacuum depositing the polymer on a ground via vacuum evaporation. Metal oxides may be substituted for the metals. The invention of Noguchi et al. may not be utilized with non-metallic pigments, and does not create a shinny metallic pigment but produces a conductive polymer. Similar polymers containing metals do not have the optical qualities desirable for pigment powders or coatings.

None of the above inventions and patents, taken either singularly or in combination, is seen to describe the instant invention as claimed. Thus, a pigment flake solving the aforementioned problems is desired.

SUMMARY OF THE INVENTION

The present invention is a method of making pigment flakes having unique qualities. These qualities include highly reflective metallic pigment flakes and unique appearing nonmetallic pigment flakes. The pigment flakes are composed of a core having a colorant deposited evenly on at least one surface thereof, preferably both. The core/colorant combination is subsequently fractured forming pigment flakes which are suitable for use in coating and printing applications.

Colorants used in the present invention are preferably organic or inorganic pigments, dyes, or combinations thereof. The core may be made of any suitable material including natural and synthetic polymers, resin and suitable combinations thereof. The core may be in any suitable form such as a continuous film, thin wires, thicker sheets, ropes, or straws.

The method for making pigment flakes according to the current invention involves providing a core of suitable material and form, depositing a fine layer of colorant molecules on the surface of the core, and fracturing the core/colorant combination to form pigment flakes. The core/colorant combination may be fractured into pigment flakes in the shape of needles, rods, spheres, cubes, small platelets, large platelets, or combinations thereof. The resulting pigment flakes may be substituted for conventional pigment powder and resinated pigments in any coating, printing or similar application. Furthermore, the pigment flakes, of the current invention, may be substituted for conventional pigment powders in any application which utilizes pigment powders provided the physical parameters, such as temperature and solvent, are appropriate.

An object of the invention is to provide pigment flakes which may be integrated into coating materials to yield brilliant, unique and light reflective surfaces. The pigment flakes of the current invention may be used in any manner in which conventional pigments are used. They are suitable for use in liquid dispersions, emulsions, pastes, powder and other forms.

It is another object of the invention to provide pigment flakes which are molecularly smooth and uniform so that light reflects off the surface at highly uniform and discreet angles. To this end, a combination of organic pigments, inorganic pigments and dyes may be used to make a single type of pigment flake having unique characteristics. Likewise, different types of pigment flakes of the current invention may be mixed in a single application to produce unique, aesthetically pleasing, optical qualities.

It is a further object of the invention to provide pigment flakes which can be integrated into coating and printing applications for use on a large variety of surfaces. Such surfaces include, but are not limited to, wood, metal, composites, plastics, paper, and paper-board. These pigment flakes may be used in paints, inks, and in any other medium which utilizes conventional pigments.

Another object of the invention is to eliminate unnecessary waste by reducing the energy and materials needed to coat substrates with a metallic coat. The invention produces less excess materials which must be discarded. Also, since the invention may be utilized directly as a pigment and/or as a binder vehicle in coating and printing applications to form highly reflective and shiny surfaces, far fewer steps are required to create the desired effect. Furthermore, less damage to the pigment flakes occurs because of less handling.

Additionally, the amount of colorant deposited by vapor deposition, and similar methods, is a tiny fraction of the amount used in conventional coatings, laminates, and the like. The cost of pigments often represents a large percentage of the total cost of conventional methods. The present invention is considerably less expensive yet yields similar, or superior, brilliance and light reflectivity. Also, the use of dyes in the pigment flakes of the present invention increases the number of available colors (hues), and broadens the potential optical effects attainable.

An object of the invention is to provide a method for manufacturing pigment flakes continuously with no interruptions except machine maintenance. The pigment flakes can be formulated for particular attributes permitting printing or coating applications to be tailored accordingly. The integration of the present invention into a coating material can be processed in line with the making of the pigment flakes. Alternatively, the making of the flakes can be a complete operation so that the pigment flakes can be sold as a pigment powder for integration into a coating at a later time, or the pigment flakes can be used directly as a pigment resin.

The pigment flakes of the present invention and the method for making the pigment flakes are unique in the field of colorants. The typical prior art which involves coating a polymer with metal then removing the polymer to form sheets of metal, or sandwiching the metal between polymer films, teaches in the opposite direction of the present invention.

These and other objects of the present invention will become readily apparent upon further review of the following specification.

DETAILED DESCRIPTION OF THE PREFERRED EMBODIMENT

A preferred embodiment of the present invention utilizes the direct vacuum deposit of a colorant upon the surface of a prepared core material. Other vapor deposition procedures are contemplated by the current invention. The coated core material is then fractured to form pigment flakes having a core with a colorant deposited thereon. The pigment flakes are further utilized for coating or printing materials.

The method for making pigment flakes has several steps. The first step is to provide the core material. The core material may be any suitable material having the appropriate characteristics for the particular application envisioned.

Preferably, the core material is composed of a thermoplastic polymer, a thermoset polymer, a resin or mixtures thereof. The preferred core compositions may be conveniently divided into coating types depending on the desired utility. The coating types are solvent, aqueous, radiation curable, powder, and extrusion. For many applications, it is desirable for the core to be as dry as possible, preferably moisture free, and capable of being throughput in a metallizer.

Additives are widely used, especially in thermoplastic and thermoset polymers, and may be added to the core material of the present invention as is conventional. Common additives include plasticizers, thermal and light stabilizers, flame-retardant agents, fillers colorants, processing aids, impact modifiers and biocides. Also, curing agents are commonly added to encourage crosslinking. Furthermore, antistatic and blowing agents, and compatibilizers are sometimes added to polymers. It is well known in the art to identify which additives should be utilized with different polymers. The presence of an effective amount of additives in the core, or no additives, is contemplated by the present invention.

Suitable core material for the solvent type coats includes vinyl, vinyl chloride/vinyl acetate copolymer, polyamide, polyethylene, polyvinyl alcohol, acrylic, urethane, urethane/acrylate, polyester, epoxy, epoxy acrylate, epoxy urethane, ethyl cellulose, and nitrocellulose. Aqueous coats include casein, starch, carboxy-methyl cellulose, polyvinyl acetate, ethylene acrylic acid, styrene butadiene, acrylic, urethane, polyethylene, and shellac. Radiation curable coats include urethane, epoxy, acrylates and copolymers of combinations thereof which may be ultraviolet (UV), thermal, or electron-beam (EB) curable. Powder coats are divided into two types: Type I and Type II. Type I are thermosets which include epoxy, epoxy polyester hybrids, polyester-carboxyl types, polyester-hydroxyl (urethanes) and acrylics. Type II are thermoplastics which include polyamides (nylons), polyolefins including polyethylene and polypropylene, polyvinyl chloride, polyester and polyvinylidene fluoride. Extrusion coats include polyethylene, polypropylene, polystyrene, polyester, and ethylene acrylic acid.

MYLAR (trademark) available from DuPont Packaging and Industrial Polymers (Wilmington, Del.) is a suitable polyester core material. Casein is a phosphoprotein of milk that is precipitated from milk by heating with an acid or by the action of lactic acid in souring and is used in making paints and adhesives, or is produced when milk is curdled by rennet and is used in making plastics. Industrial Grade Casein, 30/40 mesh, is available from Houghton Chemical Co. (Allston, Mass.).

In the next step, the core material is compounded and processed into a uniform form. Potential forms for the core include a thin or thick film, a wire, a thread having a rectangular cross section, and a bead string. Any form is acceptable provided that the form is uniform. The uniform form of the core must be such that it can be fed through a vacuum chamber or other apparatus, and kept as thin as possible for a good pigment to polymer ratio. The preferred form is that of a thin film having a thickness of about 0.00025 inches and composed of thermoplastic or thermoset polymeric film. The particular form utilized depends on the ultimate desired shape of each pigment flake. Potential shapes include needlelike, rodlike, spherical, cubic, small platelet and large platelet. The term molecule, as used herein, refers to a tiny bit of something or a small particle, and does not necessarily refer to the smallest particle into which an element or a compound can be divided without changing its chemical and physical properties.

The colorant material is provided next. The colorant can be pigments, dyes or combinations thereof. Virtually, any pigment or dye found in the Colour Index, or elsewhere, is appropriate provided that it can be vapor deposited by either chemical or mechanical vapor deposition processes. Commercial pigments typically contain more chemical components than the pigment that departs hue. Commercial pigments may contain proprietary additives or trace impurities in addition to the major component. The colorant material provided in the present invention may contain additives and trace impurities as virtually any pigment or dye can be utilized in the present invention regardless of source. For suitable sources of colorants, reference is made to the Colour Index for a listing of manufacturers of pigments and dyes.

Pigments are insoluble, and are physically and chemically unaffected by the vehicle or substrate in which they are incorporated. Pigments are classified as organic or inorganic. Organic pigments are divided into the subclasses: insoluble azo, precipitated azo, precipitated non-azo, and insoluble non-azo. The organic subclasses are divided into additional categories, and so forth. Inorganic pigments are divided into the subclasses: colored (salts and oxides), blacks, white and metallic. Reference is made to the Colour Index for an essentially complete list of the primary (nonproprietary) constituents of pigments. Pure metals and alloys are considered inorganic pigments herein even if not included in the Colour Index or elsewhere as such. Metal/alloys which are suitable include, but are not limited to, aluminum, silver, gold, copper, germanium, nickel, zinc, magnesium, manganese, platinum, lead, tin, osmium, scandium, titanium, vanadium, chromium, cobalt, gallium, indium, cadmium, palladium, rhodium, ruthenium, molybdenum, niobium, zirconium, yttrium, lanthanum, hafnium, tantalum, tungsten, rhenium, iridium, thallium, bismuth, antimony, combinations thereof, and alloy combinations thereof including, but not limited to, brass, bronze, chrome and white gold. Alloys containing mercury, carbon and other elements are also suitable. Metals, metal oxides and their alloys are considered herein to be inorganic pigments.

Dyes are intensely colored/flourescent organic substances which may be complexed with metals. Typically, dyes selectively absorb light rather than reflect light. Substrates retain dyes by mechanical retention or chemical bonds. Dyes may be absorbed, held in solution or trapped in/on the substrate. Alternatively, dyes may bind to the substrate by ionic or covalent bonds. Dyes as contemplated by the present invention are held on or at the surface of the core material. Reference is made to the Colour Index for an essentially complete list of the primary (nonproprietary) constituents of dyes.

The pigment flakes of the current invention are suitable for use in any application that utilizes pigments including powder coating, printing and curing applications regardless of whether the colorant is a pigment, dye, or combination thereof. Any colorant material that can be vaporized without decomposition is suitable, and is contemplated by the present invention.

The colorant material is vaporized. Any suitable technique may be used preferably a physical vaporization process is used including, but not limited to, vacuum evaporation, sputtering, arc vaporization, ion plating and combinations thereof. Most preferably vacuum evaporation is utilized. Any other technique to deposit a fine layer of colorant material onto the core material is acceptable. Chemical vaporization processes may be used if necessary. Furthermore, sublimation techniques, such as metallizing or dye sublimation, may be used to deposit colorant on the core.

At least one surface of the core material is exposed to the vaporized colorant material, and a fine layer of colorant is formed on the exposed surface of the core material. The preferred method of vaporizing the pigment and exposing a surface of the core material to the vaporized pigment material utilizes a vacuum evaporation chamber. Additional methods utilizing vacuum chambers include sputtering, ion, and arc vaporization deposition techniques. Chemical vapor deposition processes may be used.

The vaporized colorant material is deposited immediately after vaporization onto the exposed surface of the core material. Optionally, newly formed core material may be exposed to the vaporized colorant material before the core material has had an opportunity to set. The core material will set with the pigment material affixed to the outer surface. On the molecular level, the molecules of the pigment material immediately adjacent to molecules of the core material are integrated therein forming a demarcation region where some of both materials is present. Pigment material will not become dislodged from the surface of the core material but will remain firmly in place. Alternatively, colorant may be deposited on the core material after it has set.

The resultant colorant layered core material is fractured into flakes. Any conventional techniques may be utilized to fracture the colorant layered core material including stirring, ultrasonic, vibration, rotating brushes, grinding, any other mechanical techniques and combinations thereof. Depending on the core material, for example soft thermoplastics, it may be necessary to chill the colorant layered core material prior to fracturing. The term fractured, as used herein, refers to the act of breaking the core into particles of suitable size for the desired application. Any method which can break the core/colorant combination into small particles is included in the meaning of the term fractured. Such methods include shaking, ultrasonic, brushes, cutting, or combinations thereof. Methods used to fracture pigment particles are conventional. It may be desirable to screen the fractured pigment particles through a sieve or other screening device to yield uniform pigment flakes.

The resulting pigment flake is a fine flake of core material having a shape with an external surface having a thin layer of pigment material deposited thereon. The shape may be needlelike, rodlike, spherical, cubic, small platelet and large platelet. If the form is flat, the thin layer of colorant material may be deposited on one or both sides. If the form is cubic, the thin layer of colorant material may be deposited on one or more sides. Otherwise, the thin layer of colorant material may be deposited on part of the external surface of the needlelike, rodlike or spherical shapes, or the material may be deposited around the entire shape. The colorant material may be mixed with other colorant material before being utilized in a coating or printing composition.

The pigment flakes of the present invention may be used in any application which requires pigment powder. Such applications include paints, inks, glazes, and other coating compositions. The application used will enhance the inherent color of the pigment flakes of the current invention creating unique and unusual optical effects.

An example of an in-line manufacturing paradigm for making the pigment flakes of the current invention includes providing a core material having a uniform form, such as on a roll, and advancing the core material into a vacuum chamber where a vapor of colorant material is deposited on the exposed surface of the core. The entire surface of the core may be covered or just part of the core may be covered. Then the pigment and core is fractured in-line subsequent to the deposition of the pigment material on the core. The resulting pigment flakes are ready for use in any application that calls for pigment powder. Alternatively, a core compounding process may be provided in-line with the vacuum chamber so that a vapor of colorant material is deposited on the exposed surface of the core immediately following the processing of the core material into a uniform form.

It should be noted here that, depending on the shape of the core and the exposed surface of the core, the surface of the core may or may not be covered by colorant. The ratio of surface having colorant deposited thereon and surface lacking colorant can be strictly controlled. Also, both the thickness of the core and the colorant layer may be controlled. Ratio and thickness affect the optical qualities of the resulting pigment flakes. Other aspects of the end product may be varied by the characteristics of the core and variations in the deposition process.

By varying the initial polymer formula several characteristics of the final product can be influenced such as thickness of the core, nature of the deposit, and final particle size can be influenced. These properties would influence the degree of light reflection, color intensity, adhesion to surfaces and substances, and resistance to environmental affects such as abrasion, heat or chemical corrosion.

The preferred specifications of both the colorant and core material utilized in the present invention can be determined without undue experimentation by reviewing specifications and data sheets. Specifications and data sheets are available from the manufacturer, and typically delineate the evaporation temperature, melting point, glass transition, etc. The intended environment of the inks or coatings containing the pigment flakes of the present invention determines the precise parameters desired of both the core and the colorant material.

Five specific examples of pigment flakes and methods for making pigment flakes according to the present invention are detailed hereinafter. The first example demonstrates a method for making pigment flakes which produces powder coating flakes. Multiple steel panels approximately 6" by 12" were powder coated on both sides with an acid-functional polyester resin, Ruco 911 (acquired from Ruco Polymers, Columbus, Ga.), using conventional electrostatic powder coating techniques thereby providing the core material. The coating thickness was about 1.2 mils (0.0012 inches). The core material on the panels were then vacuum metallized with about 1200 angstroms (4.72×10–6 inches) of aluminum in a commercial vacuum metallizer to yield glossy metallized surfaces on both sides of the panels. The panels were then scraped clean of the metallized coating and the coarse metallized flakes were ground in a small laboratory grinder at high speed for approximately 10 seconds to yield fine flakes. The fine flakes were screened through a 140-mesh sieve to yield pigment flakes ready for further powder coating and other printing/coating applications, as discussed hereinabove.

The second example demonstrates a method for making pigment flakes having a colorant deposited on a core of polyvinyl alcohol. Small rolls of commercial water-soluble polyvinyl alcohol films (the core material) were obtained from Chris Craft Industrial Products of Gary, Ind. Sheets of MONO-SOL (Trademark) M-7031 (cold water soluble) film 1.5 mil (0.0015 inches) thick were vacuum metallized on both sides in a commercial vacuum metallizer with aluminum at a thickness of approximately 1200 angstroms (4.72× 10–6 inches). Small pieces of the metallized cold-water soluble films were placed in a conventional kitchen coffee grinder (Mr. Coffee Model Ids-50) along with about 50 grams of dry ice to embrittle the polyvinyl alcohol films. The films and dry ice were ground together for about 1 to 2 minutes. The mixture of dry ice and polyvinyl alcohol flakes was placed in a refrigerator to allow the dry ice to sublime without water condensation. After about 1 to 2 hours the polyvinyl alcohol coarse flakes were ready for use in any coating or printing application which requires pigment flakes, as discussed hereinabove.

The third example demonstrates a method for making casein flakes. A mixture of casein (Industrial Grade, 30/40 mesh; Houghton Chemical Co., Allston, Mass.) and glycerin was prepared for coating according to the following procedure: 325 grams of water was blended with 32 grams of isopropyl alcohol, 65 grams of casein powder was added while stirring to suspend the casein powder, and approximately 5 grams of concentrated ammonium hydroxide was added to bring the pH to above 9.0 and to dissolve the casein. This mixture was stirred for about five minutes and the 13 grams of glycerin was added as a plasticizer. Finally, about 2.2 grams of DeeFo defoamer (HG 12, Ultra Additives, Inc., Paterson, N.J.) was added. The mixture was allowed to stand for about one hour to produce a substantially bubble-free coating mixture. Subsequently, the mixture was coated on SAPPI U/C Opal release paper using a number 100 coating rod from R. D. Specialties to yield a coating which wets the release paper, forms a glossy continuous film but peels off readily. The coating thickness was about 0.6 to 0.7 mils (0.0006 to 0.0007 inches). Coated sheets measuring 12' by 14" were metallized in a conventional vacuum metallizer (Mueller Corp.) with aluminum at a thickness of about 1200 angstroms (4.72×10–6 inches). The metallized casein coatings were then peeled off and the coarse pieces placed in a conventional kitchen coffee grinder as discussed hereinabove. The pieces were ground for about 10 seconds to yield pigment flakes ready for use in any suitable coating/printing application.

The fourth example demonstrates a method for making polyester resin flakes. A mixture of polyester resin was prepared using polyester polymer pellets available under the tradename Eastek 1200, a co-polyester available as a dispersion or polymer pellets under the tradename Eastek 1000 (Eastek products acquired from Eastman Chemical Company), a surfactant composed of a 50/50 mixture of the acetylenic diols tetramethyl-5-decyne-4,7-diol,2,4,7,9- and 2 propanol and available under the tradename SURFYNOL (trademark) 104PA (acquired from Air Products and Chemicals, Inc., Allentown, Pa.), and isopropyl alcohol. In a vessel, 254 grams of Eastek 1200 was blended with 109 grams of Eastek 1000. In a separate vessel 1.8 grams of Surfynol 104PA was added to 25 grams of isopropyl alcohol. This mixture was added slowly to the Eastek polymer blend with stirring to provide a coating solution of polyester resin. The coating solution was coated on SAPPI U/C Opal release paper using a number 60 coating rod from R. D. Specialties to yield a coating which wets the release paper, forms a glossy continuous film which peels off readily. The coating thickness was about 1.2 mils (0.0012 inches). Coated sheets measuring 12' by 16" were metallized in a conventional vacuum metallizer (Mueller Corp.) with aluminum at a thickness of about 1200 angstroms (4.72×10−6 inches). The metallized polyester coatings were then peeled off and the coarse pieces placed in a conventional kitchen coffee grinder as in the above example. The pieces were ground for about 10 seconds to yield pigment flakes for use in any suitable application.

The fifth example demonstrates another method of making polystyrene resin flakes. A sample of Kama polystyrene film (200 gauge or 0.002 inches thick) was metallized, as in the above example, with approximately 300 angstroms of aluminum. The polystyrene film was obtained from CP Films Inc. of Martinsville, Va. This sample was cut into small pieces and ground into coarse flakes using a "burr" grinder (normally used for coffee grinding) manufactured by Pavoni (model MEC 256). Multiple passes through the "burr" grinder can produce smaller flakes depending on the requirements of the pigment flakes of the invention.

It is to be understood that the present invention is not limited to the embodiments described above, but encompasses any and all embodiments within the scope of the following claims.

What is claimed is:

1. A method for making pigment flakes, the method comprising the steps of:
   providing a core material having a uniform form;
   providing a colorant material;
   vaporizing the colorant material;
   exposing a surface of the core material to the vaporized colorant material so as to form a layer of colorant on the exposed surface of the core material; and
   fracturing the resultant colorant layered core material into flakes.

2. The method of claim 1, wherein the step of fracturing the resultant colorant layered core material into flakes further comprises
   exposing the colorant layered core material to dry ice in order to embrittle the colorant layered core material;
   fracturing the dry ice and the colorant layered core material together forming flakes; and
   subliming the dry ice under refrigeration to avoid water condensation.

3. The method of claim 1, wherein the step of fracturing the resultant colorant layered core material into flakes comprises
   grinding the colorant layered core material to create flakes; and
   screening the flakes through a mesh sieve.

4. The method of claim 1, wherein the uniform form ranges in thickness from about 0.00025 inches to about 0.003 inches.

5. The method of claim 1, wherein the uniform form is taken from the group consisting of a film, a wire, a thread having a rectangular cross section, and a bead string.

6. The method of claim 1, wherein:
   the step of providing a core material includes compounding and processing the core material into a uniform form; and
   the step of exposing a surface of the core material to the vaporized colorant material immediately follows the processing of the core material into a uniform form.

7. The method of claim 5, wherein the uniform form ranges in thickness from about 0.00025 inches to about 0.003 inches.

8. The method of claim 1, wherein the colorant material is taken from the group consisting of an inorganic pigment, an organic pigment, a dye, and combinations thereof.

9. The method of claim 1, wherein the colorant material is an inorganic pigment taken from the group consisting of aluminum, silver, gold, copper, germanium, nickel, zinc, magnesium, manganese, platinum, lead, tin, osmium, scandium, titanium, vanadium, chromium, cobalt, gallium, indium, cadmium, palladium, rhodium, ruthenium, molybdenum, niobium, zirconium, yttrium, lanthanum, hafnium, tantalum, tungsten, rhenium, iridium, thallium, bismuth, antimony, and oxides, alloys, and combinations thereof.

10. The method of claim 1, wherein the steps of vaporizing the colorant and exposing a surface of the core material to the vaporized colorant material utilizes a vacuum chamber.

11. The method of claim 1, wherein the core material is taken from the group consisting of resin, polymer, thermoplastic, thermoset polymer, and combinations thereof.

12. The method of claim 11, wherein the core material is taken from the group consisting of vinyl, vinyl chloride/vinyl acetate copolymer, polyamide, polyvinyl alcohol, acrylic, urethane, urethane/acrylate, polyester, epoxy, epoxy acrylate, epoxy urethane, ethyl cellulose, nitrocellulose, casein, starch, carboxy-methyl cellulose, polyvinyl acetate, ethylene acrylic acid, styrene butadiene, acrylics, shellac, epoxy polyester hybrids, polyester-carboxyl types, polyester-hydroxyl (urethanes), polyamides (nylons), polyolefins, polyvinyl chloride, polyvinylidene fluoride, polystyrene, ethylene acrylic acid, and combinations thereof.

13. The method of claim 11, wherein the core material is radiation curable.

14. The method of claim 12, wherein the polyolefins are taken from the group consisting of polyethylene, polypropylene, and combinations thereof.

15. The method of claim 11, wherein the core material further comprises additives taken from the group consisting of surfactants, plasticizers, thermal stabilizers, light stabilizers, flame-retardant agents, fillers, colorants, processing aids, impact modifiers, biocides curing agents, antistatic agents, blowing agents compatibiizers, and combinations thereof.

16. A pigment flake comprising:
    a core material having a specific shape with an external surface; and
    a layer of colorant material deposited on at least a part of the external surface of the core material, wherein molecules of the colorant material immediately adjacent to molecules of the core material are integrated therein forming a demarcation region where some of both materials is present.

17. The pigment flake of claim 16, wherein the shape is taken from the group consisting of needlelike, rodlike, spherical, cubic, small platelet, and large platelet.

18. The pigment flake of claim 16, wherein the colorant material is taken from the group consisting of an inorganic pigment, an organic pigment, a dye, and combinations thereof.

19. The pigment flake of claim 16, wherein the colorant material is an inorganic pigment taken from the group consisting of aluminum, silver, gold, copper, germanium, nickel, zinc, magnesium, manganese, platinum, lead, tin, osmium, scandium, titanium, vanadium, chromium, cobalt, gallium, indium, cadmium, palladium, rhodium, ruthenium, molybdenum, niobium, zirconium, yttrium, lanthanum, hafnium, tantalum, tungsten, rhenium, iridium, thallium, bismuth, antimony, and oxides, alloys, and combinations thereof.

20. The pigment flake of claim 16, wherein the core material is taken from the group consisting of resin, polymer, thermoplastic, thermoset polymer, and combinations thereof.

21. The pigment flake of claim 20, wherein the core material is taken from the group consisting of vinyl, vinyl chloride/vinyl acetate copolymer, polyamide, polyvinyl alcohol, acrylic, urethane, urethane/acrylate, polyester, epoxy, epoxy acrylate, epoxy urethane, ethyl cellulose, nitrocellulose, casein, starch, carboxy-methyl cellulose, polyvinyl acetate, ethylene acrylic acid, styrene butadiene, acrylics, shellac, epoxy polyester hybrids, polyester-carboxyl types, polyester-hydroxyl (urethanes), polyamides (nylons), polyolefins, polyvinyl chloride, polyester, polyvinylidene fluoride, polystyrene, ethylene acrylic acid, and combinations thereof.

22. The pigment flake of claim 20, wherein the core material is radiation curable.

23. The pigment flake of claim 20, wherein the polyolefins are taken from the group consisting of polyethylene, polypropylene, and combinations thereof.

24. A pigmented coating application having a medium for suspension of pigment flakes comprising:
pigment flakes suspended in the medium wherein each pigment flake has a fine flake of core material, a shape with an external surface, and a thin layer of colorant material deposited on at least part of said external surface.

25. The pigmented coating application according to claim 24 wherein molecules of said colorant material immediately adjacent to molecules of said core material are integrated therein forming a demarcation region where some of both materials is present.

26. The pigmented coating application according to claim 24 wherein the coating application is taken from the group consisting of liquid dispersions, emulsions, pastes, powder, paints, inks, laminates, and resins.

27. The pigmented coating application according to claim 24 wherein said thin layer of colorant material is deposited on substantially all of said external surface.

28. The pigmented coating application according to claim 24, wherein the shape is taken from the group consisting of needlelike, rodlike, spherical, cubic, small platelet, large platelet, and combinations thereof.

29. The pigmented coating application according to claim 24, wherein the colorant material is taken from the group consisting of an inorganic pigment, an organic pigment, a dye, and combinations thereof.

30. The pigmented coating application according to claim 24, wherein the colorant material is an inorganic pigment taken from the group consisting of aluminum, silver, gold, copper, germanium, nickel, zinc, magnesium, manganese, platinum, lead, tin, osmium, scandium, titanium, vanadium, chromium, cobalt, gallium, indium, cadmium, palladium, rhodium, ruthenium, molybdenum, niobium, zirconium, yttrium, lanthanum, hafnium, tantalum, tungsten, rhenium, iridium, thallium, bismuth, antimony, and oxides, alloys, and combinations thereof.

31. The pigmented coating application according to claim 24, wherein the core material is taken from the group consisting of resin, polymer, thermoplastic, thermoset polymer, and combinations thereof.

32. The pigmented coating application according to claim 31, wherein the core material is taken from the group consisting of vinyl, vinyl chloride/vinyl acetate copolymer, polyamide, polyvinyl alcohol, acrylic, urethane, urethane/acrylate, polyester, epoxy, epoxy acrylate, epoxy urethane, ethyl cellulose, nitrocellulose, casein, starch, carboxy-methyl cellulose, polyvinyl acetate, ethylene acrylic acid, styrene butadiene, acrylics, shellac, epoxy polyester hybrids, polyester-carboxyl types, polyester-hydroxyl (urethanes), polyamides (nylons), polyolefins, polyvinyl chloride, polyester, polyvinylidene fluoride, polystyrene, ethylene acrylic acid, and combinations thereof.

33. The pigmented coating application according to claim 31, wherein the core material is radiation curable.

34. The pigmented coating application according to claim 31, wherein the polyolefins are taken from the group consisting of polyethylene, polypropylene, and combinations thereof.

* * * * *

UNITED STATES PATENT AND TRADEMARK OFFICE
CERTIFICATE OF CORRECTION

PATENT NO. : 6,582,506 B2  Page 1 of 1
DATED : June 24, 2003
INVENTOR(S) : Michael E. Archambeault It is certified that error appears in the above-identified patent and that said Letters Patent is hereby corrected as shown below:

Column 14,
Line 40, after "blowing agents", please delete "compatibiizers" and insert
-- compatibilizers --.

Signed and Sealed this

Sixteenth Day of December, 2003

JAMES E. ROGAN
*Director of the United States Patent and Trademark Office*